July 21, 1936.　　　M. H. AMES ET AL　　　2,047,943
CINEMATOGRAPHIC PRINTER
Filed Oct. 31, 1932　　　8 Sheets-Sheet 1
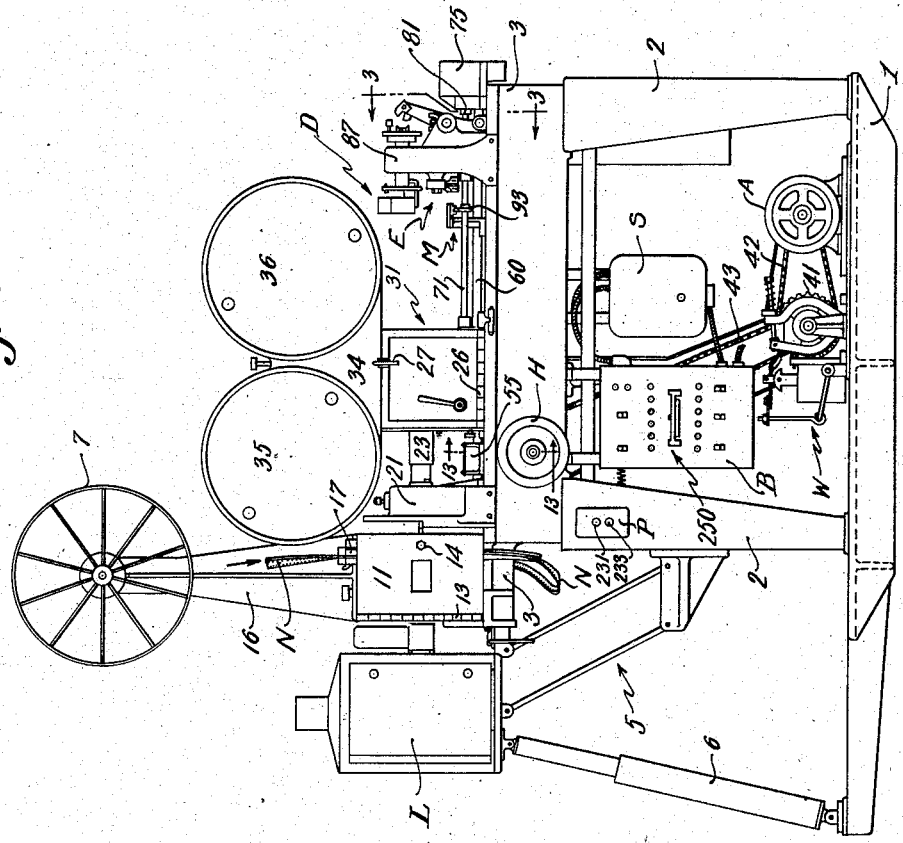

July 21, 1936.  M. H. AMES ET AL  2,047,943
CINEMATOGRAPHIC PRINTER
Filed Oct. 31, 1932  8 Sheets-Sheet 2

Inventors
Malcolm H. Ames and
Leonard T. Troland, dec'd
by Cambridge Trust Co. Executor
by Roberts, Cushman & Woodbury
Attys.

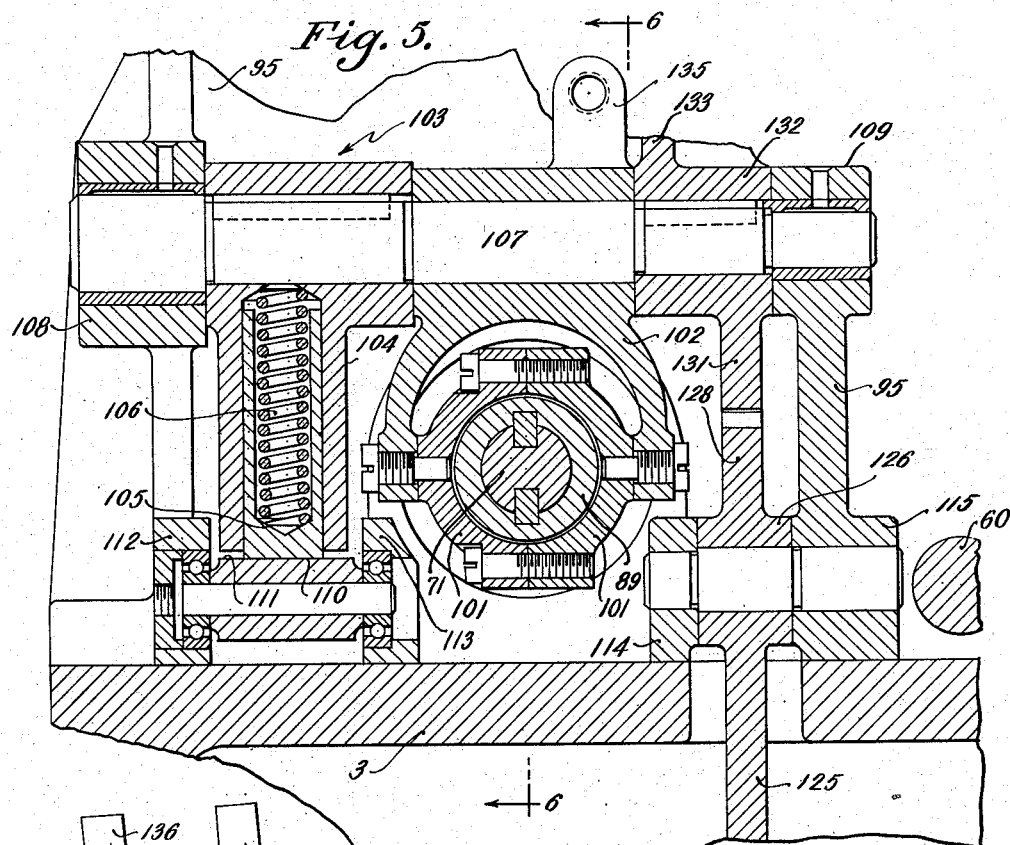
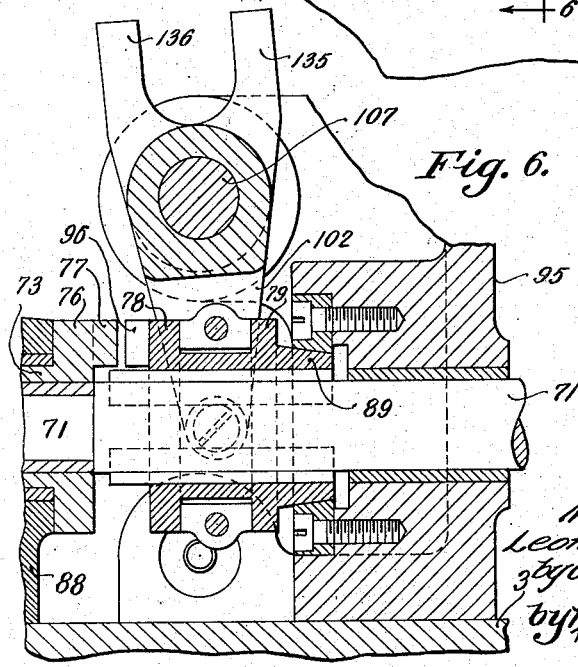

July 21, 1936.  M. H. AMES ET AL  2,047,943
CINEMATOGRAPHIC PRINTER
Filed Oct. 31, 1932   8 Sheets-Sheet 4

Inventors
Malcolm H. Ames and
Leonard T. Troland, dec'd
by Cambridge Trust Co. Executor
by Roberts Cushman Woodbury
Attys.

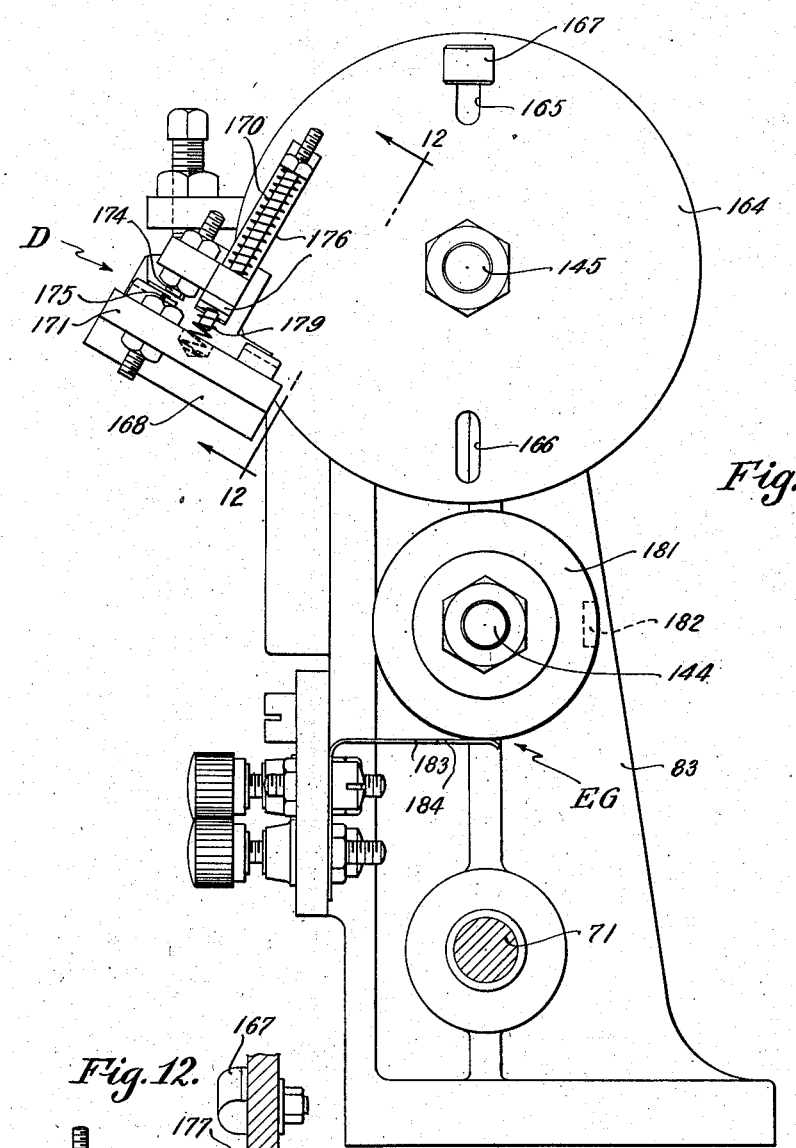
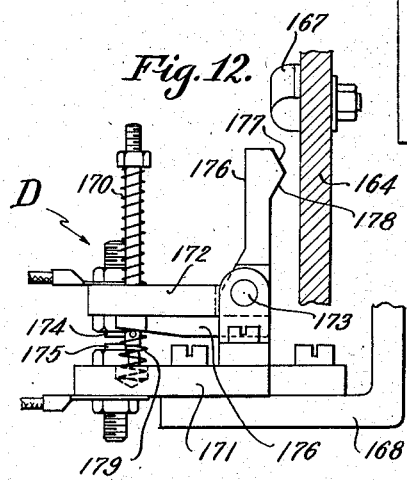

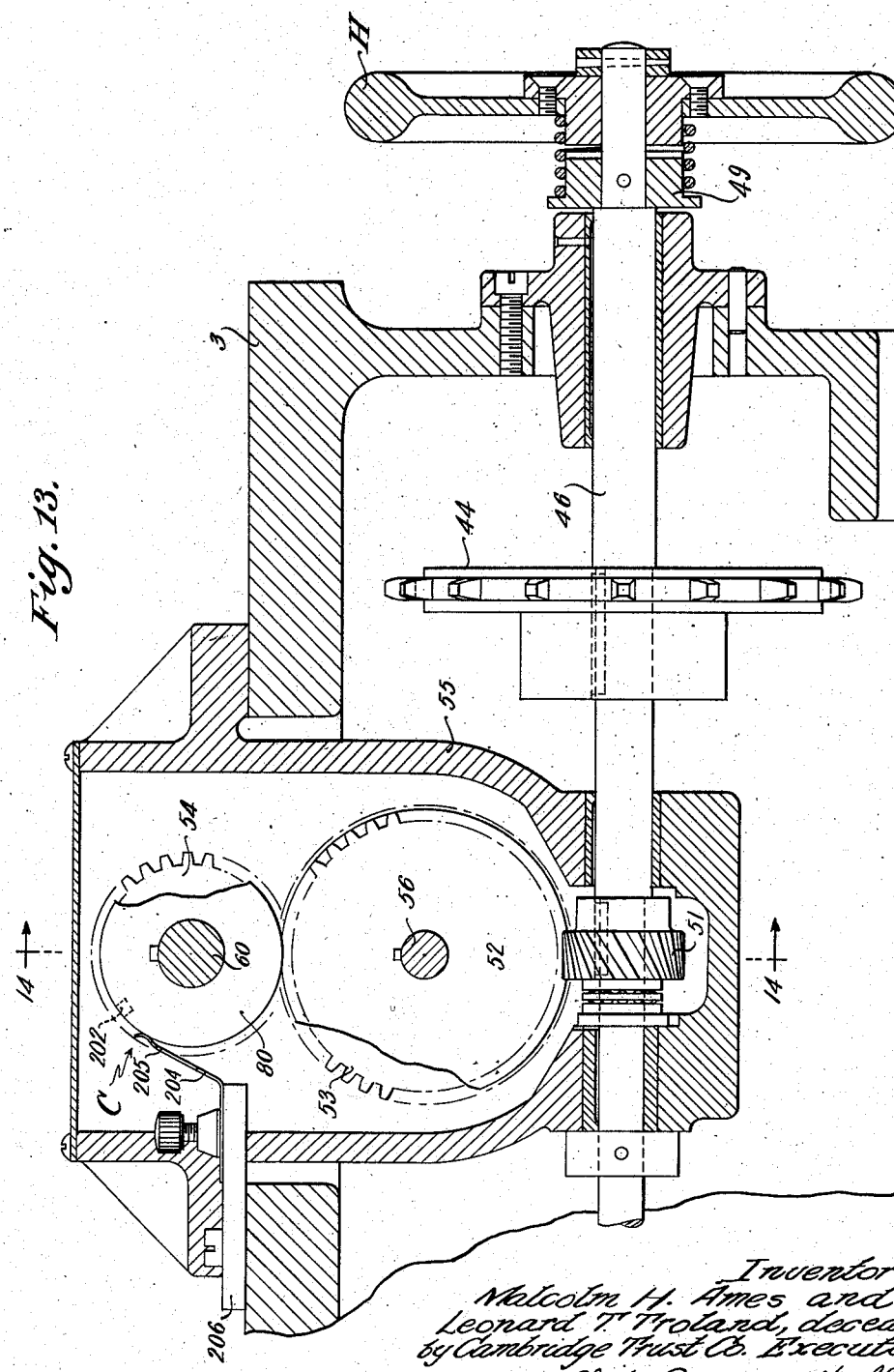

July 21, 1936.  M. H. AMES ET AL  2,047,943
CINEMATOGRAPHIC PRINTER
Filed Oct. 31, 1932  8 Sheets-Sheet 7

Inventors
Malcolm H. Ames and
Leonard T. Troland, decd.
by Cambridge Trust Co. Executor
by Roberts, Cushman & Woodbury
Attys.

July 21, 1936.  M. H. AMES ET AL  2,047,943
CINEMATOGRAPHIC PRINTER
Filed Oct. 31, 1932  8 Sheets-Sheet 8
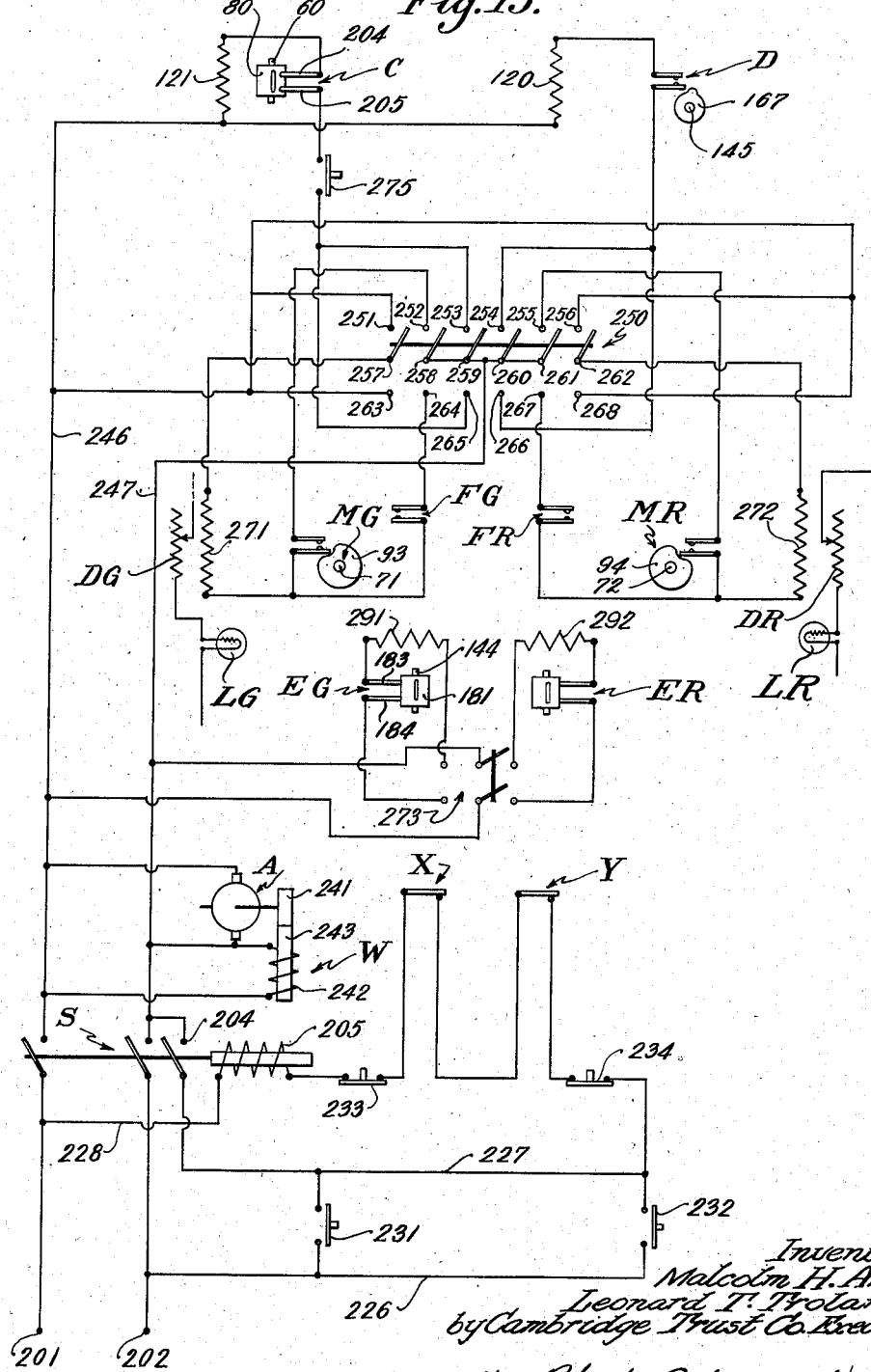
Inventors
Malcolm H. Ames &
Leonard T. Troland, dec'd
by Cambridge Trust Co. Executor
by Roberts, Cushman & Woodbury
Attys.

Patented July 21, 1936

2,047,943

UNITED STATES PATENT OFFICE 2,047,943

CINEMATOGRAPHIC PRINTER

Malcolm H. Ames, Los Angeles, Calif., and Leonard T. Troland, deceased, late of Cambridge, Mass., by Cambridge Trust Company, executor, Cambridge, Mass., assignors to Technicolor Motion Picture Corporation, Hollywood, Calif., a corporation of Maine Application October 31, 1932, Serial No. 640,510

27 Claims. (Cl. 88—24)

The printing of complemental film strips from negative films bearing several series of images, for example on machines of the general character of the film printer described and claimed in the Patent No. 1,738,095 to Herbert O. Carlton, dated December 3, 1929, involves the manipulation of at least three film strips and the operation of several film movements and of a number of auxiliary devices. It is difficult to coordinate the operations of these various elements so as to avoid waste of time and film, especially if only short positive film strips are to be printed. It is therefore the principal object of the present invention to provide a cinematographic multiple printer which performs the operations necessary for printing complemental film strips under various conditions, substantially independent of the attention of the operator. Other objects are to provide for the automatic printing of normal or short length positive film strips from a film bearing series of alternate juxtaposed color separation negatives, to provide for the automatic starting and stop of film movements of a multiple printer in order to simplify its operation and to avoid waste, to provide for the adaptability of such a printer to varying printing requirements, to provide for automatic control of the printing lights of a multiple printer during normal printing or test printing for control purposes, to provide for safe and easily adjustable operation, control, and adaptation to varying conditions of an electrically controlled multiple printer, to provide special clutches, clutch control devices and switches for a printer of this type, and generally to provide an automatic multiple projection printer which provides for the simplified, yet controllably correct manufacture of separate positive films from multiple color separation negatives.

In one aspect of the invention, the new machine, which prints simultaneously from complemental negative pictures upon a single negative film strip, starts to print from one series of complemental pictures, then, after a period during which the first picture of the second series of negatives has reached its aperture, automatically starts the printing of that second series. If only a certain length of positive film is required it stops first the printing of one series of pictures after the required length has been printed, and thereafter stops the printing of the other series with the picture complemental to the last printed picture of the first series.

In another aspect, the invention contemplates the automatic control of the printing light sources of a film printer either in accordance with the varying character of the scenes depicted on the film, or optionally independent thereof in predetermined regular steps. For this purpose means are provided for controlling the exposure light dimmers with markings of the negative film, and also means for controlling dimmers from the driving mechanism of the machine and provisions for optionally employing either system according to requirements.

In a further aspect, the invention contemplates an electric control system for performing or initiating the various functions of a multiple projection printer, for changing from one mode of operation to another, for mutually excluding several possible functions of the printer and for making the machine generally fool-proof. The invention also provides for electrically controlled mechanical clutches which are especially adapted for a machine of this kind since they eliminate any uncertainty and inexactness of operation.

Additional objects of the invention will be apparent from the following description of a typical concrete embodiment illustrated by drawings, in which:

Fig. 1 is a side elevation of the new printer;

Fig. 2 is a diagrammatic plan thereof;

Fig. 5 is a cross-section through the coupling mechanism on lines 5—5 of Fig. 4;

Fig. 6 is a cross-section on line 6—6 of Fig. 5;

Fig. 11 is a cross-section on lines 11—11 of Fig. 4;

Fig. 12 is a section on lines 12—12 of Fig. 11;

Fig. 13 is a cross-section on lines 13—13 of Fig. 1;

Fig. 15 is a connection diagram of the electrical equipment of the machine.

Figure 3:
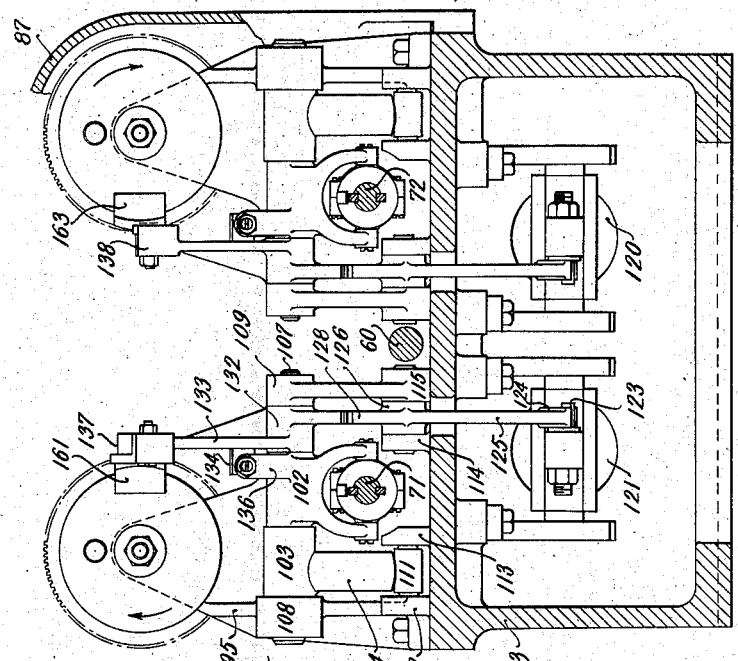
Fig. 3 is a vertical cross-section on lines 3—3 of Figs. 1 and 4.

Referring to Figs. 1 and 2, the general arrangement of the embodiment of the invention chosen for the purpose of illustration will first be described. Raising from a base plate 1, legs 2 support a bed plate 3 (not shown in diagrammatic Fig. 2), which provides a rigid table on which the mechanisms of the printer proper are mounted. The printing lamps are contained in a lamp housing L which can be brought into printing position and swung back from the printer by means of a parallelogram 5 and a yielding support 6. The arrangement of the light sources is not part of the present invention and is therefore not described in detail. Next to the lamp housing are boxes for negative or primary film movements, which will be referred to herein as "negative film heads" 11 and 12. They may form a single unit as indicated in Fig. 2 and have light-proof doors with hinges 13 and locks 14. To the top of the negative heads is fastened a negative reel support 16 with a negative film supply reel 7, and a similar negative film take-up reel 8 coaxial thereto. The negative film strip N is unwound from 7, enters negative head 11 through a light seal at 17, is threaded through a suitable negative film movement and negative aperture within negative head 11, leaves 11 at the bottom, is turned 180°, enters negative head 12 at the bottom, is threaded through a negative film movement and negative aperture within head 12, leaves 12 at the top at 18 and is wound upon reel 8. Next to the negative heads are lens supports 21 and 22 for optical systems suitable for a projection printer of this type. Light-proof tubes 23 (Fig. 1) connect with positive heads 31 and 32, each having a door with a horizontal hinge 26 and a lock 27 and supporting a positive reel support 34 with light tight film supply and take-up reel housings 35 and 36, the reels being driven from the printer drive by suitable means not shown as not forming an essential part of the present invention. A positive film G coming from 35 enters head 31 at 37, is fed past a positive aperture by a suitable positive or secondary film movement within the positive head 31, leaves its top at 38 and is wound up within 36. Similarly, a second positive film R enters positive head 32 at 39, is fed past its positive aperture, leaves 32 at 40 and is wound upon its take-up reel. In this manner, a negative film strip N, bearing two series of alternating complemental pictures, as for example records of corresponding color aspects of an object field, passes first through the negative aperture of negative head 11 from where every other picture is projected towards the positive aperture of head 31 onto positive film G which is advanced within 31 with half the speed of the negative film strip. The negative strip is then conducted through the second negative head 12 whence the pictures of the second series of pictures are projected towards the second positive head 32 with the second positive film strip R. It will be understood that this operation is not limited to two series of complemental images, or to series of color aspect records, but hereinafter the negative and positive elements of the two sides of the printer will be designated as "red" and "green", respectively, assuming that the negative film strip contains alternately red and green color records of a two-color process for taking pictures in natural colors. It will also be understood that film strip N must not necessarily contain negative images, but that it may be a positive strip bearing picture series to be separated.

Figure 7:
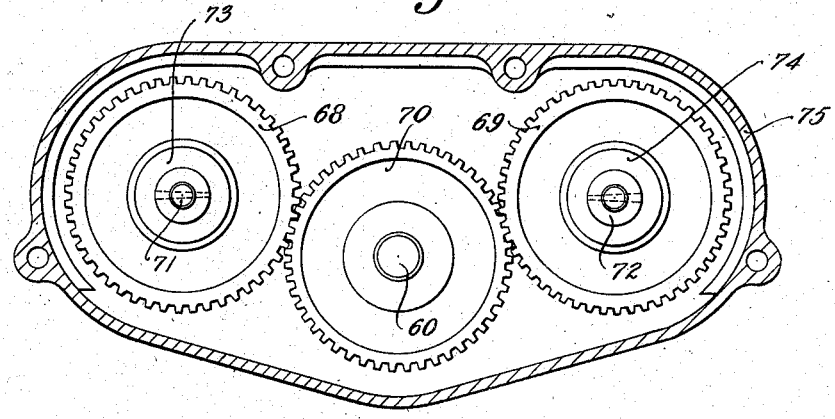
Fig. 7 is a cross-section through the gear box on lines 7—7 of Fig. 4.

Power is supplied to the printer by an electric motor A mounted on base plate 1, which drives over sprockets 41 and chains 42, 43, a sprocket wheel 44 on shaft 46 (Fig. 2) journaled in the bed plate. Shaft 46 also has handwheels H fixed thereto over resilient clutches 49 (Fig. 13) so that the machine can be manually operated if desired, as for example for threading the films, adjusting the clutch mechanisms, etc. Shaft 46 drives a worm gear 51, 52 (Figs. 13 and 14) and a gear 53, 54, both gears being enclosed in a gear box 55 which also supports shaft 56 for gear wheels 52 and 53. A main shaft 60 extends over the whole length of the bed plate 3, is keyed to gear wheel 54, and supported by journals mounted in the film heads and the clutch mechanism, as will be apparent from the drawings without further explanation. Within the negative heads, shaft 60 has fixed thereto a bevel gear wheel 66 (Fig. 2) driving the negative film sprockets and the negative film reels, and a gear wheel 67 from which the negative film movements are driven. At the other end, shaft 60 has a gear wheel 70 meshing with two gear wheels 68 and 69 within a housing 75 keyed to auxiliary shafts 73 and 74 (Figs. 2 and 7). These auxiliary driving shafts can be coupled with two side shafts 71 and 72 by clutches 81 and 82, shafts 71 and 72 constituting separate driving means for each positive movement. Side shafts 71 and 72 also have gear wheels 91 and 92 for the clutch control mechanism which will be described in detail hereinafter. Side shafts 71 and 72 have further cams 93 and 94 for the machine dimmer switches and the main shaft 60 has a switch disk 80 for the safety switch. These switches and their function will also be described later in detail. The machine frame further supports an electrically operated motor brake W, a starter S, a control board B and remote control buttons P.

As mentioned before, main shaft 60 drives two auxiliary shafts 73 and 74 through gears 70, 68 and 69 which are protected by a housing 75 (Fig. 7). The auxiliary shafts 73, 74 are hollow and journaled upon the side shafts, and together with these shafts 71 and 72 in end bearing blocks 88 screwed to bed plate 3 (Fig. 6). Only one clutch control mechanism will be described, the second being essentially similar. The hollow shaft 73 has at one end a flange 76 with a clutch tooth 77 (Figs. 3, 4, 5, 6). The side shaft 71 has a corresponding clutch sleeve 89 shiftably keyed thereto, which can be moved by means of collars 78, 79, ring 101 and fork 102. Sleeve 89 has also one tooth 96, so that the clutch halves can only engage at a certain relative position of the two shafts. The fork 102 is journaled on a shaft 107 supported by bosses 108 and 109 of clutch gear support 95 and has two stops 135, 136 with adjustment screws extending opposite of fork 102. Keyed to shaft 107 is a clutch actuator 103 with a cylinder 104, a plunger 105 and a spring 106 tending to move the plunger outwardly. The plunger has an edge 110 (Figs. 3 and 5) which cooperates in a manner which will be described hereinafter, with a roller 111, journaled in bosses 112 and 113 of support 95. Also keyed to shaft 107 is a hub 132 with a toothed segment 131 and on the opposite side a follower arm 133. Within the bed plate 3 are fastened solenoids 120, 121 (Figs. 3 and 4) with armatures 122 having pins 123 engaged by form 124 of an arm 125 fast to a hub 126 rotatably mounted upon bosses 114 and 115 of clutch gear support 95. Hub 126 also has a toothed segment 128 meshing with segment 131.

The follower arm 133 has an extension 134 (Fig. 4) which protrudes into the space between the adjustment screws of stops 135 and 136 which are integral with clutch fork 102. The arm 133 has a follower 137 cooperating with a cam to be described later.

Figure 10:
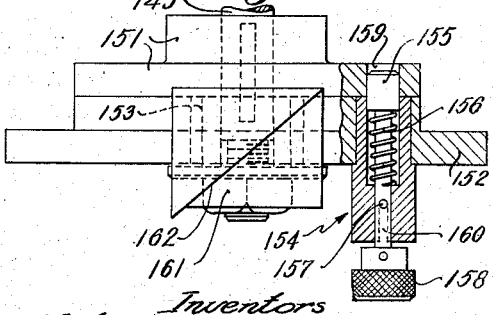
Fig. 10 is a section thereof on line 10—10 of Fig. 9.

The gear wheels 91 and 92 keyed to shafts 71 and 72 drive on both red and green sides, over trains of gears 141, 142, 143, two shafts 144 and 145 which are journaled in clutch gear supports 83 and 95 (Figs. 3, 4, 11 and 12). Shaft 144 has on one end a switch disk 181 for the edge printer switches EG and ER to be described later, and shaft 145 has affixed to one end thereof a clutch control flange 151 and to the other end the disk 164 of delay switch D, also to be described later. A cam disk 152 rotates on extension 153 of flange 151, being secured thereto by a screw as shown in Fig. 10. Disk 152 has a connector 154 with plunger 155, spring 156 and cross-pin 157. If the plunger extends into perforation 159 of flange 151, disk 152 rotates with flange 151 and shaft 145, whereas disk 152 turns loosely on shaft and flange if the plunger is retracted and kept in that position by turning knob 158 so that pin 157, previously inserted in slot 160 of connector 154, now rests on the edge thereof, retaining plunger 155 in retracted position. Disk 152 has adjustably attached thereto a cam block 161 having an oblique face 162 adapted to actuate follower 137.

The delay switch disk 164 with which, in the present embodiment, only the green side is equipped, (Figs. 11 and 12) has slots 165 and 166 by means of which a cam 167 can be screwed to one of two diametrically opposite points of the disk. The delay switch D comprises a support 171 screwed to a flange 168 of support 83, and a plate 172 hinged to the support at 173. The plate has an adjustable screw contact 174 opposite a similar contact 175 of the support, and is pressed by spring 170 towards an arm 176 with oblique faces 177, 178 adapted to cooperate with cam 167 of disk 164 and, together with plate 172, hinged at 173. An adjustable spring 179 tends to separate the two contacts, which are closed during the period when cam 167 passes over faces 177 and 178, whereby spring 170 prevents breakage which might result from an unyielding arrangement.

The clutch control device operates as follows: Assuming that the clutch is disengaged and that the machine runs with auxiliary shafts 73 and 74 rotating, if solenoid 121 is energized, it attracts armature 122 and moves lever arm 125 (Fig. 4) to the left thereby turning hub 132 on shaft 107 through gear segments 128 and 131. This moves arm 133 with extension 134 towards the left of Fig. 4 (to the right of Fig. 6). The extension 134 strikes stop 135 and moves clutch sleeve 89 toward the left of Fig. 6 into engagement with the other clutch half. Since each clutch half has only one tooth, shafts 73 and 71 can only be coupled once within each turn of the shafts, at a certain point of the cycles defined by the speed of the printer. Upon shaft 71 being coupled to shaft 73, the gear train 91, 141, 142, 143 starts to rotate flange 151 slowly, the relative speed of shaft 145 depending upon the proportions of the gear train. If disk 152 is coupled to flange 151 with plunger 155 as above described, cam 161 slowly approaches follower 137 and moves it towards the right of Fig. 4. Extension 134 comes into contact with stop 136 which moves fork 102 towards the left, thereby opening the clutch. The clutch actuator 103 assures positive action of the clutch in the following manner. Rotation of hub 132, due either to action of the solenoid 121 or the cam 162 is transmitted through shaft 107 to cylinder 104 and the edge 110 of the plunger 105 moves towards roller 111. One plunger face being pressed against the roller causes the plunger to be moved into the cylinder against the force of spring 106, until edge 110 reaches the top of the roller. At that moment, the spring and the other plunger face cause the cylinder to move quickly forward, extension 134 suddenly advances towards stop 135 or 136 respectively, and quickly engages or disengages the clutch. By suitably choosing the rate of rotation of flange 151, the dimensions of the clutch actuator and the position of cam 162 relative to the positions of shaft 71, the clutch can be engaged or disengaged, and retained in its respective position at a predetermined point within the working cycle of the machine. By disconnecting disk 152 from flange 131, the automatic uncoupling function can be eliminated, and, if desired, the clutch disengaged by manually moving the arm 133 to the right of Fig. 4.

The clutch control mechanism for the positive head 32 of the red side operates in a similar manner. In the embodiment herein described, the clutch 81 is closed through energizing magnet 121 by means of push button, and clutch 82 through energizing magnet 120 by closing the contacts 174 and 175 of delay switch D, as will be explained in detail hereinafter. It will now be apparent that, by properly positioning cams 161, 163 and control switch cam 167, clutch 81 can be closed, that after a certain time, clutch 82 can also be closed by means of the delay switch D energizing solenoid 120, that, after a predetermined time, clutch 81 can be opened through the action of cam 161, and that finally, again after a certain period, clutch 82 can be opened through cam 163.

The intermediate gear shafts 144 of the clutch gear supports have affixed thereto, as mentioned before, switch disks 181 of edge printer switches EG and ER. Disk 181 (Figs. 4 and 11) is made of insulating material and has a conducting insert 182, which electrically connects contacts 183 and 184, once during every turn of shaft 144. Since the rotatory speed of shaft 144 has a definite relation to that of the main shaft, the contacts 183 and 184 make contact at predetermined intervals within the working cycle of the machine, for a purpose to be explained hereinafter.

Figure 4:
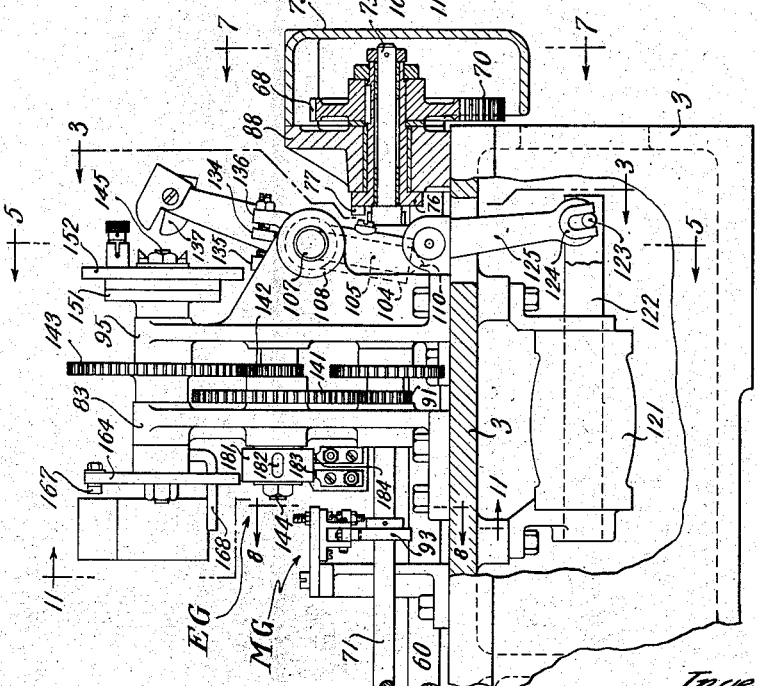
Fig. 4 is a side elevation of the gear box end of the machine, with part of the machine bed broken away and the gear box in section.
Figure 8:
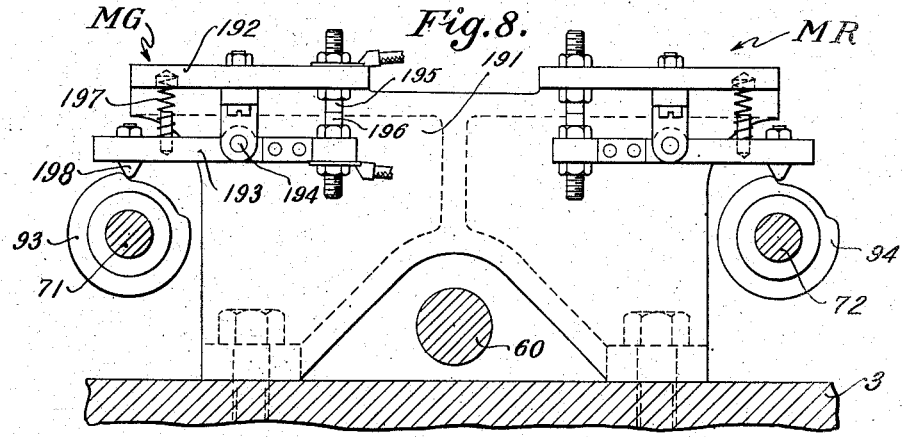
Fig. 8 is a cross-section on lines 8—8 of Fig. 4.
Figure 9:
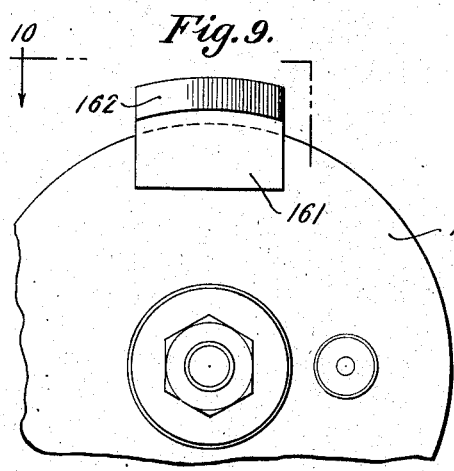
Fig. 9 is an enlarged front view of a cam disk.

Between clutch control supports and positive heads, there is on each side a switch MG and MR respectively, herein referred to as machine dimmer switches (Figs. 4 and 8). These switches are mounted on a switch support 191 with switch support plates 192 screwed thereto, and switch levers 193 hinged to the support plate at 194. Adjustable contacts 195 and 196 are fastened to the plate and lever respectively, and a spring 197 tends to press these contacts together. Followers 198 on levers 193 cooperate with cam disks 93 and 94 fast on shafts 71 and 72. These switches make one contact during each revolution of side shafts 71 and 72, and their function will be described hereinafter.

Side shafts 71 and 72 extend into the two positive heads where they drive the respective film movements in suitable manner, as well as the four positive film reels mounted on the positive heads. Neither these movements nor the drives are shown, since their design is not part of the present invention.

Figure 14:
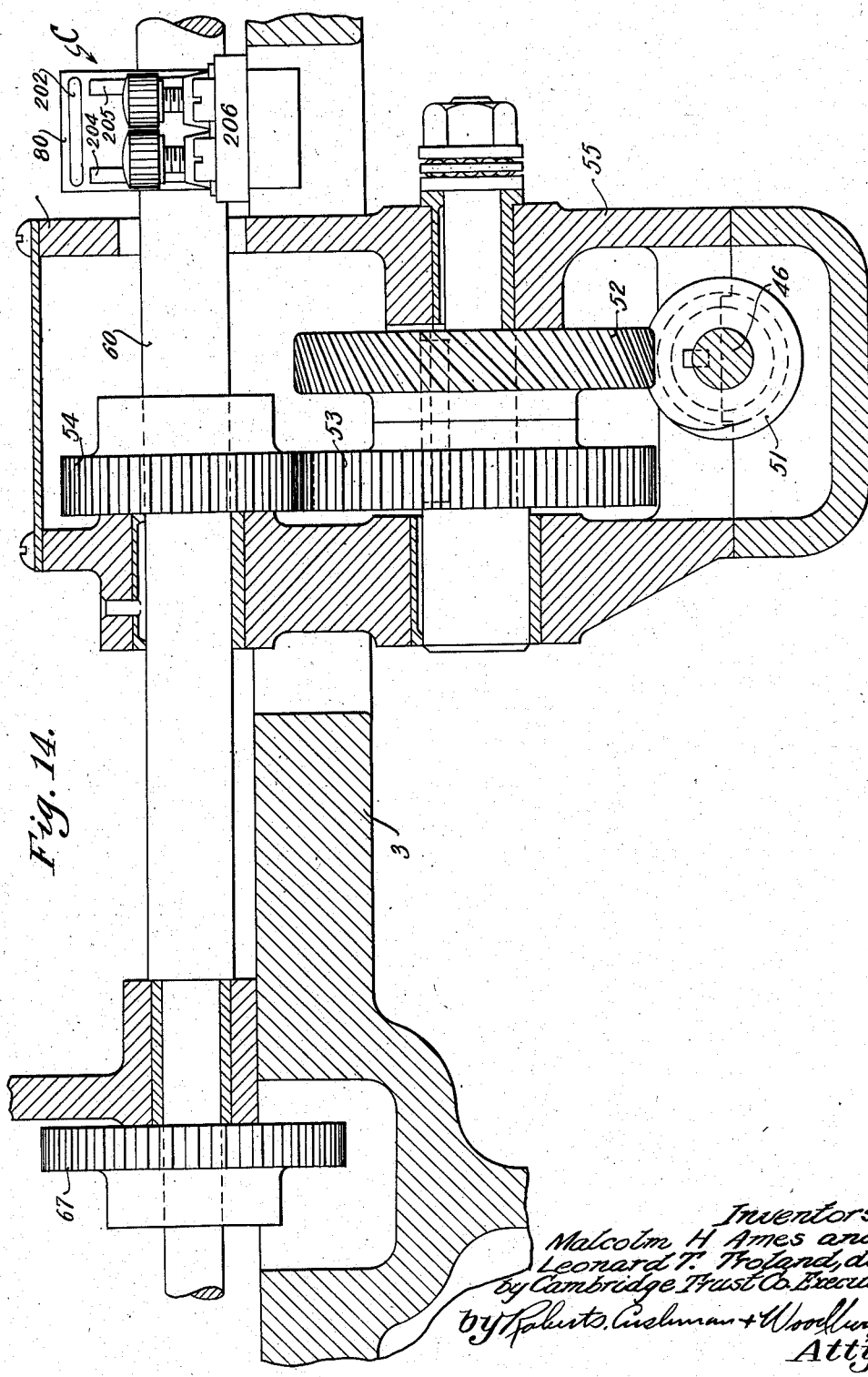
Fig. 14 is a longitudinal section on lines 14—14 of Fig. 13 with the disk switch shown.

The main shaft passes between the positive boxes as shown in Fig. 2 and on the other side of these boxes operates a switch C, herein referred to as safety switch (Figs. 13 and 14). The safety switch comprises a disk 80 of insulating material fast on shaft 60 and having a metallic insert 202. Two contacts 204, 205 are supported by a plate 206 screwed to bed plate 3, and slide on disk 80. The safety switch is therefore adapted to close a circuit during each turn of the main shaft, for a purpose to be explained later.

Intermediate the two negative heads 11 and 12 the main shaft has keyed thereto the gear wheel 67 and the bevel gear wheel 66. As described hereinbefore, gear wheel 67 drives over appropriate gear trains the film movements of boxes 11 and 12, and bevel gear 66 similarly, over a vertical shaft, the film reels 7 and 8. These more or less conventional drives are not shown, as not constituting an essential part of the invention. As also mentioned before, the negative movements advance the negative film N, in the embodiment herein described, two frames for each advanced frame of the positive films, since the green and red color records which alternate upon the negative film are to be printed separately upon adjacent frames of the respective positive films. The speeds of the main shaft and the side shafts can be suitably varied, but in the present embodiment, the main shaft makes one revolution per two film advancing steps, that is per one picture change, and the side shafts make one revolution per one advancing step.

Referring to Fig. 15, the electric control arrangement of the new printer will now be described. The main terminals 201, 202 of the machine are supplied with suitable current and lead to a starting switch S having an auxiliary contact 204. Switch S can be closed by means of a magnet 205 adapted to be energized from the line through a circuit including conductor 226, normally open starting push buttons 231 (with conductor 227) and 232, normally closed stopping switches 233, 234, X, Y, and conductor 228. Starting and stopping push buttons may be conveniently mounted at various easily accessible points of the machine, as indicated in Fig. 1 at P. Switches X and Y are auxiliary switches which will herein be referred to as "butterfly switch" and "stop pin switch" respectively and whose function will be explained later. If auxiliary contact 204 is closed, magnet 205 is directly supplied through conductor 227, which short circuits the starting buttons, thereby establishing a holding circuit. The motor A is connected behind switch S, has a brake W comprising disk 241 and brake magnet 242 which lifts the brake 243 from the brake disk if the motor is supplied with current. Conductors 246 and 247 lead to the change-over switch 250, conveniently arranged on switchboard B (Fig. 1), and provided with twelve contacts 251 to 256 and 263 to 268, and six contact 257 to 262, in the manner shown in Fig. 15. Change-over contact knives 258, 259, 260, 261 are directly connected to conductor 247, whereas the two remaining contact knives 257 and 262 lead to terminals of dimmer control magnets 271 and 272 which operate resistances or dimmers DG and DR controlling the intensity of two printing lamps, LG for the green side and LR for the red side, which are suitably arranged in lamp housing L. Arrangements for controlling dimmers of printing lights with current impulses are well known in the art and therefore not described herein in detail. The other terminals of dimmer control magnets 271 and 272, respectively, are connected to printer or film movement operated machine dimmer switches MG and MR, whose mechanical design has been described hereinbefore (Figs. 1 and 8). These machine dimmer switches are further connected to contacts 252 and 255 of switch 250. In parallel to the dimmer switches are two switches FG and FR herein referred to as "film dimmer switches", which lead to contacts 264 and 267 of switch 250. The film dimmer switches are operated in a well known manner by notches or nicks in the negative film for varying the printing light intensity in accordance with requirements of varying scenes depicted on the film to be printed. Contacts 253 and 265 lead over a normally open push button switch 275, herein referred to as "clutch starting switch", to the safety switch C whose mechanical design has been described hereinbefore. Contacts 254 and 266 lead to delay switch D, likewise described hereinbefore. The other terminals of C and D are connected to the two clutch magnets 120 and 121 respectively, whose other terminals lead to conductor 246. The remaining contacts 251, 256, 263 and 268 are also joined to lead 246 and complete the clutch control circuit. The edge printer switches EG and ER, described hereinbefore, are in series with edge printer solenoids 291 and 292 and either of these switches and solenoids can be connected to the current supply busses by means of a change-over switch 273. These solenoids operate shutters associated with the film apertures in negative heads 11 and 12 and control the exposure of marginal marks on the negative films for selectively printing such marks upon the positive films. The edge printer control arrangement is not part of the present invention, but forms the subject matter of the copending application for "Film marking", of Leonard T. Troland, Serial No. 640,511, of even date.

The operation of the new printer is as follows: If it is intended to copy during a so-called "straight run" a length of negative film containing for example two sets of alternate complemental green and red color image records, upon two positive film strips, referred to as "green positive" and "red positive", the three films are threaded in their respective movements as described hereinbefore, the cam disks 152 are disconnected by retracting and turning connector knob 158, and switch 250 is closed in its lower position, so that contacts 251 to 262 connect with contacts 263 to 268, respectively. In this position, switch 250 establishes the following circuits. Dimmer control circuits are closed from 246 through 263, 257, 271, FG, 264, 258 to 247 for the green side and from 246 through 268, 262, 272, FR, 267, 261 to 247 for the red side. Clutch control circuits are closed from 246 through 121, C, 275, 265, 259 to 247 and from 246 through 129, D, 266, 260 to 247. The printer can now be started by pressing starter button 231 or 232 and the negative movements commence to feed the negative film. If an appropriate length of the negative lead has passed through negative head 11, button 275 is pressed and closes clutch 81 by energizing solenoid 121 whereupon positive head 31 starts to advance the green positive film G. In order to avoid closing of the clutch when its teeth are in coincidence, the contact closing segment 202 of the safety switch C is so arranged with respect to the two engaging tooth faces of the clutch, that the energizing circuit of 121 can only be closed by pressing 275, if the clutch teeth are not in superposition. Preferably, the segment closes the circuit shortly before the faces approach each other, and in this manner the movement for G is started at an exactly predeterminable point of the operating cycle of the negative movements, so that the proper relation between the advancing motions of negative and positive films is automatically established. After a certain period depending upon the number of picture frames between the red and green negative movements, cam 167 of delay switch D closes contacts 174 and 175, magnet 120 is energized and closes clutch 82, so that the movement for film R begins to run as soon as the first red negative to be printed arrives in the aperture of head 12. This circuit does not require a safety switch similar to C, since cam 167 can be positioned to energize 129 at an exactly predeterminable moment. It is evident that the rotatory speed of disk 164, and the position of cam 167 thereon must be adjusted according to the length of the film loop between 11 and 12, and that the corresponding time elapsing between the starting of the two positive movements respectively, can be varied by moving 167 on 164 or by changing the ratio of the gear which drives disk 164. The machine operates now normally, each negative head transporting the film N twice for one shift of films G and R respectively. In this manner, the two sets of alternating color aspect negatives are properly separated, the green aspect positives being printed on G, and the red positives on R. The dimmer control magnets 271 and 272 are controlled by film breakers FG and FR in the circuits above described, FG and FR being operated by notches or other marks at appropriate points of the negative film, as well known in the art. After the whole negative reel, or a desired part thereof is printed, the machine is stopped by pressing one of stop buttons 233, 234. If it should be desired to start both positive films together with the negative film, the clutches can be thrown in by hand before starting the printer, so that upon pressing button 231, the negative as well as the positive movements start to run immediately.

Switches X and Y are normally closed, and operated by emergency stopping devices associated with the lamp housing ventilation and the negative film movements respectively. If one of these devices becomes operative, the respective switch X or Y is opened and the machine stopped. If it should be desired to print without any dimmer change and/or automatic control generally, as for example with only part of the film movements, switch 250 can be set in intermediate position and the clutches manually operated to suit particular requirements, with cam disks 152 disconnected and cam 167 removed.

In many instances, as for example for supervisory or test purposes, it is required to print certain standardized film lengths or "stubs", for example approximately 4½ feet corresponding to 72 frames, of each positive, in exactly the same manner as the normal printing would take place. This mode of operation will be referred to as "stubbing". For stubbing, both clutch cam disks are connected to their flanges, the clutches disengaged and switch 250 closed in its lower position, connecting the circuits described above for the straight run. The negative movements are then started for example with button 231 and, when the desired portion of N appears in head 11, positive movement 31 is started with button 275 and begins to print the green positives. After the proper time, when the first red negative to be copied appears in 12, the delay switch D, properly set, throws in clutch 82, starting head 32 by connecting shafts 72 and 74 in correct relative position for unison motion of the movements in 12 and 32 and at the same time starting to rotate the cam disk for clutch 82. After the desired number of green frames is printed, cam 161 of cam disk 152, properly set, engages follower 137 and disconnects movement 31 at a moment which can be exactly predetermined due to the momentary action of clutch actuator 103. After the corresponding number of red pictures has been printed, cam 163 of the second clutch controller disconnects clutch 82 thereby bringing the positive movement 32 to rest. The negative movements can be kept running, perhaps for printing a second stub from the same film reel, or the whole printer can be stopped with 233 or 234.

The machine described herein as an embodiment of the invention is for example set for printing stubs of 72 frames, the loop between the green and red negative apertures comprising 36 frames of each color, or 72 negative frames altogether. The gears and cams as shown in the drawings start movement 32 after 36 green frames are printed. After 36 more green frames, and 36 red frames are printed, the clutch controller disconnects movement 31, 72 green frames having been copied, and after 36 more red frames are printed, the controller of clutch 82 disconnects movement 32.

For purposes of determining certain characteristics of a final color film made with the aid of separate positive film strips G and R, especially for evolving the most favorable balance of the intensities of the printing colors, which depends to some degree upon the photographic character of the positives G and R and therefore also of the exposure, it is desirable to combine a series of prints covering a comparatively wide range of exposures of the records of one color aspect of a certain scene, with a similar series of prints of the other color aspect. This procedure will be referred to as "wedging" and involves a change of the exposure light intensity for each consecutive positive film frame, which, for several reasons can not be advantageously controlled by marks in the negative film. The new printer is particularly adapted for operations of this type which are carried out in the following manner.

The clutch control mechanisms and the delay switch are in operative position as for the stubbing operation described above, but switch 250 is moved into its upper position so that contacts 257 to 262 and contacts 251 to 256 respectively are joined. This inserts the printer controlled machine dimmer switches MG and MR in the two dimmer control circuits (246—251—257—271—MG—252—258—247 and 246—256—262—272—MR—255—261—247) instead of the film operated dimmer switches, without changing the clutch control circuits. As described before, machine dimmer switches MG and MR make one contact for each revolution of shafts 71 and 72, and therefore for each shift of the positive films. The printer is then started, and operates as described for the "stubbing" operation, with the exception that the machine dimmer switches MG and MR are operative instead of the film dimmer switches. During each closing of these switches, in the present example once for each frame change, the dimmers receive a current impulse, so that the exposure of each frame is somewhat different from that of the preceding frame. In the present instance, two positive film strips, each with 144 frames differently exposed within ranges according to the dimmer set-up, are obtained, whereby the operator needs merely to start the machine with button 231 and, when the appropriate portion of the negative film arrives at the aperture of 11, to start the positive drive with button 275. The machine prints then the two positive wedge stubs automatically and sets the positive drive at rest, whereupon the whole machine can be stopped by pressing 233, or another stub can be printed from the same negative reel by pressing button 275 at the appropriate moment.

It will be understood that the machine can be adjusted to meet various conditions and requirements; that, for example, stubs of any desired length can be printed, that, by adding a third negative head and a third positive head with the respective control organs, the printer can be adopted for printing from a negative bearing alternate records of three-color aspects, or that the light change for wedging can be initiated after any desired number of frames by suitably gearing machine switches MR and MG.

It should be understood that the present disclosure is for the purpose of illustration only and that this invention includes all modifications and equivalents which fall within the scope of the appended claims.

What is claimed:—

1. A cinematographic projection printer comprising two negative film movements, each optically associated with a positive film movement, means conjointly driving said negative movements, and means for separately driving said positive movements from said conjoint driving means.

2. A cinematographic printer comprising a negative film movement, a positive film movement associated therewith, means for driving said negative movement, means for coupling said positive movement with said driving means, and means controlled by said positive movement for disconnecting said coupling means.

3. A cinematographic printer comprising two negative film movements, two positive film movements associated therewith, means for conjointly driving said negative movements, means for coupling each positive movement with said conjoint driving means, and means controlled by the respective positive movements for automatically uncoupling each positive movement after a predetermined time from the operation of its coupling means.

4. A cinematographic printer comprising two negative film movements, two positive film movements associated therewith, means conjointly driving said negative movements, separate means for drivingly connecting each positive movement with said conjoint driving means, means associated with one of said positive movements for making its respective connecting means inoperative, and means associated with said positive movement for making the connecting means for the second positive movement operative.

5. A cinematographic printer comprising two negative film movements, two positive film movements associated therewith, a shaft driving said negative movements, couplings connecting said positive movements with said shaft, means for closing said couplings, means associated with one positive movement for automatically actuating said closing means for the other positive movement, means for manually actuating the closing means for said first positive movement, and means associated with said positive movements for automatically disconnecting their respective couplings.

6. A cinematographic printer comprising associated negative and positive film movements, a driving shaft for the negative movements, clutches connecting said positive movements to said shaft, solenoids for closing said clutches, and means controlled by one of said positive movements for energizing the clutch solenoid associated with another positive movement.

7. A cinematographic printer comprising a negative and a positive film movement, a driving shaft for the negative movement, a side shaft and an auxiliary shaft connected by a clutch for driving said positive film movement, gears connecting said driving and said auxiliary shaft, a cam disk geared to said side shaft and a clutch actuating follower cooperating with said cam for opening said clutch.

8. A cinematographic printer comprising a negative and a positive film movement, a driving shaft for said negative movement, a clutch connecting said positive movement with said shaft, a cam disk geared to said positive movement, a clutch actuating follower cooperating with said cam for opening said clutch, and means storing the energy transmitted to said follower for momentary action at a predetermined position of said cam.

9. A cinematographic printer comprising a negative film movement, a positive film movement, means for driving said negative movement, a clutch intermediate said driving means and said positive movement, a control shaft geared to said positive movement actuating an electric switch and a cam, clutch operating means including a clutch opening follower cooperating with said cam and a clutch closing solenoid energized by said switch, and a clutch actuator intermediate said clutch and said clutch operating means, said actuator being adapted to operate said clutch substantially instantaneously at predetermined positions of said control shaft.

10. A cinematographic printer comprising an electrically driven main shaft, a side shaft driving a film movement, a clutch intermediate said main shaft and said side shaft, electric means for actuating said clutch and a switch in the actuation circuit of said electric means, said switch being controlled by said main shaft, and completing said circuit at a predetermined position of the clutch element associated with said main shaft.

11. A cinematographic printer comprising two negative film movements, two positive film movements associated therewith, a main shaft driving said negative movements, clutches intermediate said main shaft and said positive movements, electric clutch closing means for each clutch, clutch opening means for each clutch, control means for actuating the clutch closing means of one of said clutches when the other clutch has been closed for a predetermined period, and means for opening each clutch after a predetermined time from its closing.

12. A cinematographic printer comprising an electrically driven main shaft, a side shaft driving a film movement, a clutch intermediate said main shaft and said side shaft, electric means for closing said clutch, and an actuating circuit for said clutch closing means including in series a hand operated switch and an automatic switch, said automatic switch being controlled by one of said shafts, said automatic switch permitting energization of said circuit through said hand switch only at a certain position of the shaft controlling said switch.

13. A cinematographic printer comprising a film movement, a film movement drive, electrically controlled means for coupling said movement with said drive, electric means for initiating intensity changes of a printer light associated with said movement, film movement actuated means and film controlled means for electrically controlling said light changing means, and switching means for selectively energizing said light changing means and said coupling means together with either said film movement actuated means or said film controlled means respectively, and for alternatively deenergizing said film movement actuated means, said film controlled means and said coupling means.

14. A cinematographic printer comprising a film movement drive, two film movements associated therewith through electrically controlled film movement clutches, a control circuit for one of said clutches serially including a hand operated clutch closing switch and a printer operated interlocking switch, a control circuit for the second clutch including a printer operated clutch closing switch, a film controlled dimmer control circuit, a film movement actuated dimmer control circuit, and means for selectively energizing the clutch control circuits, together either with said film controlled circuit or said film movement actuated circuit respectively, and for completely disconnecting said circuits.

15. An electrically driven and controlled cinematographic printer comprising two primary film movements, an electric main drive therefor, two secondary film movements, two electrically controlled film movement clutches for operating said secondary movements from said drive, a main drive supply circuit, a control circuit for one of said clutches including in series a hand operated clutch actuating switch and a printer operated interlocking switch, a clutch control circuit for the second clutch including a printer drive operated clutch actuating switch, a film controlled dimmer control circuit, a printer operated dimmer control circuit, a main switch for energizing said supply circuit and said control circuits, and a switch for selectively energizing said clutch control circuits together either with said film controlled circuit or said film movement actuated circuit respectively.

16. An electrically driven and controlled cinematographic printer comprising an electric main drive, a drive supply circuit, electrically controlled film movement clutches with clutch control circuits, a dimmer control circuit, a main switch for energizing said supply circuit and said control circuits, and an actuating circuit for said main switch including a printer operated emergency stopping switch for opening said main switch by deenergizing said actuating circuit.

17. A cinematographic projection printer comprising two negative movements synchronously driven to advance two sections of a film strip, two positive film movements optically associated with respective ones of said negative film movements and containing separate films to receive reproductions from said film strip, means for actuating said positive film movements in synchronism with said negative movements, and means for automatically stopping one of said actuating means dependent upon the progress of said film strip in said negative movements.

18. A cinematographic projection printer comprising two negative movements synchronously driven to advance two sections of a film strip, two positive film movements optically associated with respective ones of said negative film movements and containing separate films to receive reproductions from said film strip, means for actuating said positive film movements in synchronism with said negative movements, and means for automatically starting one of said actuating means dependent upon the progress of said film strip in said negative movements.

19. A cinematographic projection printer comprising a negative film movement and a positive film movement optically associated through a lens system, for bringing printing and printed films respectively into consecutive exposure positions, means for driving said film movements in synchronism and means actuated by said driving means for effectively connecting said positive movement to said driving means after said negative movement has been driven to bring its film into a predetermined number of exposure positions.

20. A cinematographic projection printer comprising two negative film movements and two positive film movements optically associated through lens systems, for bringing printing and printed films respectively into consecutive exposure positions, means for driving said film movements in synchronism and means actuated by said driving means for effectively connecting one of said positive movements to said driving means after said negative movements and the other one of said positive movements have been driven to bring their films into a predetermined number of exposure positions.

21. A cinematographic projection printer comprising two negative film movements, each optically associated with a positive film movement, means for driving said negative movements, separate actuating means for each positive movement, and means for connecting and disconnecting said driving means and each of said separate actuating means.

22. A cinematographic printer comprising two negative film movements, two positive film movements associated therewith, means for driving said negative movements, means for drivingly coupling one of said positive movements with said driving means, and means controlled by said first positive movement for automatically coupling said other positive movement with said driving means.

23. A cinematographic printer comprising two negative film movements, two positive film movements associated therewith, means for driving said negative movements, means for coupling one of said positive movements with said driving means, and means for automatically uncoupling said one of said positive movements after a predetermined time from its coupling with said driving means.

24. A cinematographic printer comprising a negative film movement, a positive film movement associated therewith, a shaft driving said negative movement, a coupling connecting said positive movement with said shaft, a cam driven from said positive movement, and means operated by said cam for opening said coupling.

25. A cinematographic printer comprising a negative film movement, a positive film movement associated therewith, a shaft driving said negative movement, a clutch connecting said positive movement with said shaft, means for opening said clutch, a cam geared to said positive movement for operating said opening means in synchronism with said positive movement, and means for disengaging said cam from said movement.

26. In a cinematographic printer, two negative film movements, two positive film movements associated therewith, a drive for the negative movements, actuating means for each positive movement, means for manually connecting one actuating means to said drive, automatic means controlled by said first actuating means for connecting the other actuating means to said drive, and automatic means for disconnecting the actuating means after predetermined intervals from their connection to the drive.

27. A cinematographic printer comprising two pairs of optically associated negative and positive film movements, a driving shaft for the negative movements, separate driving and driven shafts for each positive movement, clutches intermediate said driven and driving positive shafts, gears connecting said positive and said negative driving shafts, manually controlled means for closing one of said clutches and automatic means for closing the other clutch, said automatic means being controlled by the driven shaft associated with said first clutch.

MALCOLM H. AMES.
CAMBRIDGE TRUST COMPANY,
*Executor of the Last Will and Testament of Leonard T. Troland, Deceased,*
By A. M. WHEELER,
*Assistant Secretary.*